(12) United States Patent
Mi et al.

(10) Patent No.: US 11,659,617 B2
(45) Date of Patent: May 23, 2023

(54) METHOD FOR WAKING UP TERMINAL, TERMINAL AND NETWORK DEVICE

(71) Applicant: Huawei Technologies Co., Ltd., Shenzhen (CN)

(72) Inventors: Xiang Mi, Beijing (CN); Xiaolei Tie, Shanghai (CN); Zhe Jin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/171,510

(22) Filed: Feb. 9, 2021

(65) Prior Publication Data
US 2021/0168897 A1 Jun. 3, 2021

Related U.S. Application Data (63) Continuation of application No. PCT/CN2018/100044, filed on Aug. 10, 2018.

(51) Int. Cl.
*H04W 76/28* (2018.01)
*H04W 68/00* (2009.01)
*H04W 52/02* (2009.01)
*H04W 68/02* (2009.01)

(52) U.S. Cl.
CPC ........... *H04W 76/28* (2018.02); *H04W 68/00* (2013.01)

(58) Field of Classification Search
USPC ....................................................... 370/310
See application file for complete search history.

(56) References Cited

U.S. PATENT DOCUMENTS

| 9,900,872 | B2 | 2/2018 | Liu et al. | |
|---|---|---|---|---|
| 2004/0063442 | A1* | 4/2004 | Goldberg | H04W 68/00 |
| | | | | 455/458 |
| 2008/0252297 | A1* | 10/2008 | Miglioranza | B62J 50/22 |
| | | | | 324/426 |
| 2016/0274240 | A1* | 9/2016 | Wheatley | H04B 7/18543 |

(Continued)

FOREIGN PATENT DOCUMENTS

| CN | 104427591 A | 3/2015 |
|---|---|---|
| CN | 105122871 A | 12/2015 |

(Continued)

OTHER PUBLICATIONS

Intel Corporation, "WUS consideration for efeMTC", 3GPP TSG RAN WG2 Meeting #99bis, R2-1710641, Oct. 9-13, 2017, 7 pages, Prague, Czech Republic.

(Continued)

*Primary Examiner* — Inder P Mehra
(74) *Attorney, Agent, or Firm* — Slater Matsil, LLP (57) ABSTRACT

This application provides a method for waking up a terminal, a terminal, and a network device. In technical solutions provided in this application, a network device determines, from a plurality of wake-up signals that can wake up a to-be-woken-up terminal and that need to be monitored by the to-be-woken-up terminal for one PO, a target wake-up signal of the to-be-woken-up terminal, and sends the target wake-up signal to the to-be-woken-up terminal. If the terminal detects, for the one PO, at least one wake-up signal of the plurality of wake-up signals that can wake up the terminal and that need to be monitored by the terminal, the terminal monitors a downlink control channel at the PO.

16 Claims, 2 Drawing Sheets

---

S210. A terminal determines that a plurality of wake-up signals that can wake up the terminal need to be monitored for one PO, where terminals that can be woken up by different wake-up signals in the plurality of wake-up signals are not completely the same S220. If the terminal detects at least one wake-up signal of the plurality of wake-up signals for the PO, the terminal monitors a downlink control channel at the PO (56) References Cited

U.S. PATENT DOCUMENTS

2017/0347335 A1   11/2017   Yi et al.
2018/0295595 A1*  10/2018   Shellhammer .... H04W 52/0229
2018/0332533 A1*  11/2018   Bhattad ............. H04W 52/0235
2020/0029302 A1*   1/2020   Cox ................... H04W 52/0229

FOREIGN PATENT DOCUMENTS

| CN | 107079250 A | 8/2017 |
| CN | 108377551 A | 8/2018 |
| WO | 2018036401 A1 | 3/2018 |
| WO | 2018086431 A1 | 5/2018 |

OTHER PUBLICATIONS

Oppo, "On wake-up procedure for efeMTC", GPP TSG RAN WG1 Meeting #93 R1-1806871, May 21-25, 2018, 5 pages, Busan, Korea.
Ericsson et al., "New WID on Rel-16 enhancements for NB-IoT", 3GPP TSG RAN Meeting #80, RP-181451, Jun. 11-14, 2018, 4 pages, La Jolla, USA.
Intel Corporation, "Open issue in WUS", 3GPP TSG RAN WG2 Meeting # 102, R2-1807524, May 21-25, 2018, 4 pages, Busan, Republic of Korea.
Lenovo et al., "Remaining issues on Wake Up Signal", 3GPP TSG-RAN WG2 Meeting #103, R2-1812523, Aug. 20-24, 2018, 3 pages, Gothenburg, Sweden.
Balasubramanya, N.M. et al., "DRX with Quick Sleeping: a Novel Mechanism for Energy Efficient IoT using LTE/LTE-A,," IEEE Internet of Things Journal, (vol. 3, Issue: 3, Jun. 2016), Feb. 8, 2016, 10 pages.
"Remaining aspects on wake-up signals for efeMTC," Source: vivo, Agenda Item: 6.2.6.3, Document for: Discussion and decision, 3GPP TSG RAN WG1 Meeting #93, R1-1806031, Busan, Korea, May 21-25, 2018, 6 pages.
"Report of email discussion [99bis#35][NB-IoT/MTC] on wake-up signal," Agenda Item: 9.13.9, Source: Huawei, Document for: Discussion and Decision, 3GPP TSG-RAN WG2 Meeting #100, R2-1713186, Reno, USA, Nov. 27-Dec. 1, 2017, 13 pages.
"Further consideration on wake-up signal," Source: ZTE, Sanechips, Agenda item: 9.13.9, Document for: Discussion and Decision, 3GPP TSG-RAN WG2 Meeting #101, R2-1802058, Athens, Greece, Feb. 26-Mar. 2, 2018, 6 pages.

"WUS consideration for eFeMTC," Agenda item: 9 13.9, Source: Intel Corporation, Document for: Discussion and decision, 3GPP TSG RAN WG2 Meeting #101, R2-1803302, Athens, Greece, Feb. 26-Mar. 2, 2018, 6 pages.
3GPP TS 36.300 V1 5.2.0 (Jun. 2018), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), 357 pages.
3GPP TS 23.401 V15.4.0 (Jun. 2018), 3rd Generation Partnership Project;Technical Specification Group Services and System Aspects; General Packet Radio Service (GPRS) enhancements for Evolved Universal Terrestrial Radio Access Network (E-UTRAN) access (Release 15), 410 pages.
3GPP TS 23.501 V15.2.0 (Jun. 2018), 3rd Generation Partnership Project; Technical Specification Group Services and System Aspects; System Architecture for the 5G System; Stage 2 (Release 15), 217 pages.
3GPP TS 24.301 V15.3.0, 3rd Generation Partnership Project; Technical Specification Group Core Network and Terminals; Non-Access-Stratum (NAS) protocol for Evolved Packet System (EPS); Stage 3, (Jun. 2018), 528 pages.
3GPP TS 24.501 V15.0.0 (Jun. 2018), 3rd Generation Partnership Project;Technical Specification Group Core Network and Terminals; Non-Access-Stratum (NAS) protocol for 5G System (5GS); Stage 3 (Release 15), 338 pages.
3GPP TS 36.304 V15.0.0 (Jun. 2018), 3rd Generation Partnership Project; Technical Specification Group Radio Access Network; Evolved Universal Terrestrial Radio Access (E-UTRA); User Equipment (UE) procedures in idle mode (Release 15), 52 pages.
3GPP TS 36.331 V15.2.2 (Jun. 2018), 3rd Generation Partnership Project; Technical Specification Group Radio Access Network; Evolved Universal Terrestrial Radio Access (E-UTRA); Radio Resource Control (RRC); Protocol specification (Release 15), 791 pages.
3GPP TS 36.211 V15.2.0 (Jun. 2018), 3rd Generation Partnership Project; Technical Specification Group Radio Access Network; Evolved Universal Terrestrial Radio Access (E-UTRA); Physical channels and modulation (Release 15), 236 pages.
3GPP TS 36.213 V15.2.0 (Jun. 2018); 3rd Generation Partnership Project; Technical Specification Group Radio Access Network; Evolved Universal Terrestrial Radio Access (E-UTRA); Physical layer procedures (Release 15); 541 pages.

\* cited by examiner

FIG. 1

S210. A terminal determines that a plurality of wake-up signals that can wake up the terminal need to be monitored for one PO, where terminals that can be woken up by different wake-up signals in the plurality of wake-up signals are not completely the same S220. If the terminal detects at least one wake-up signal of the plurality of wake-up signals for the PO, the terminal monitors a downlink control channel at the PO

METHOD FOR WAKING UP TERMINAL, TERMINAL AND NETWORK DEVICE

CROSS-REFERENCE TO RELATED APPLICATIONS

This application is a continuation of International Application No. PCT/CN2018/100044, filed on Aug. 10, 2018. The disclosure of which is hereby incorporated by reference in its entirety.

TECHNICAL FIELD

This application relates to the communications field, and more specifically, to a method for waking up a terminal, a terminal, and a network device.

BACKGROUND

In a wireless communications system, a terminal (user equipment, UE) has two modes: one is a connected mode, and the other is an idle mode. The idle mode may also be referred to as a sleep mode. A terminal in the connected mode has established a connection to a network device, and can directly communicate with the network device. A terminal in the idle mode cannot directly communicate with a network device.

When there is no service data to be sent or there is no service data to be received, a terminal may enter the idle mode to reduce power consumption. For a terminal in the idle mode, when a network device needs to send service data to the terminal or the network device requires the terminal to report service data, the network device may notify the terminal through paging, that is, indicate, by using a paging message, the terminal whether to switch from the idle mode to the connected mode. After receiving the paging message, the terminal may enter the connected mode under an indication of the paging message, so as to send or receive the service data.

Usually, a terminal in the idle mode periodically wakes up to listen to a paging message, to check whether there is a paging message that indicates the terminal to enter the connected mode. A cycle at which the terminal wakes up is referred to as a discontinuous reception (DRX) cycle. The DRX cycle may be indicated by a network device to the terminal by using a system message. A location at which the terminal wakes up is called a paging occasion (PO). The terminal may listen on a physical downlink control channel (PDCCH) at the PO to monitor the paging message.

The PO indicates a start location at which the terminal monitors the PDCCH. The terminal may determine a PDCCH search space based on the PO, and monitor the PDCCH in the PDCCH search space in a blind detection manner.

If the terminal detects the PDCCH, the terminal may receive a physical downlink shared channel (PDSCH) based on indication information carried on the detected PDCCH, where the PDSCH carries the paging message.

The PDCCH search space is a set of candidate locations (candidate) at which the target PDCCH may appear. The terminal monitors the PDCCH in the search space whose start location is the PO, until the PDCCH is detected or the blind detection on the entire search space is completed. If the PDCCH is not detected after the blind detection on the entire search space is completed, it is considered that the network device does not send the PDCCH.

In some wireless communications networks, such as the internet of things (IoT), a probability of paging UE is usually very low. In this case, most POs may be idle, that is, the network device does not send a corresponding PDCCH at a PO. However, the terminal still needs to monitor the PDCCH at each PO, because only after the blind detection is completed, the terminal knows whether the network device sends the PDCCH. This wastes power of the terminal. However, a terminal in the IoT is highly sensitive to power consumption. To reduce the power consumption of the terminal, a wake-up signal (WUS) is introduced for the IoT in the communications field. The network device indicates, by using the WUS, whether the terminal needs to wake up at the PO to monitor the PDCCH.

Specifically, when there is the PDCCH at the PO, for example, when the terminal needs to be paged or the system message changes, the network device sends the WUS before the PO. When there is no PDCCH at the PO, the network device does not send the WUS before the PO. There may be a plurality of POs in the IoT or a similar network. Each PO corresponds to some terminals. A terminal may calculate, based on an identifier of the terminal, a PO corresponding to the terminal.

The WUS sent by the network device is specific to the PO instead of the terminal. In other words, the network device sends a same WUS to terminals having a same PO. In this way, the terminals having the same PO monitor the same WUS.

The terminal will monitor the WUS before the PO. If the terminal detects the WUS signal, the terminal starts to monitor the PDCCH at the PO. If the terminal does not detect the WUS signal, the terminal does not wake up at the PO to monitor the PDCCH.

The terminal usually calculates the PO of the terminal based on the identifier of the terminal, and then monitors the WUS before the PO. Because POs of a plurality of terminals may be the same, when the network device sends the WUS to a terminal to wake up the terminal to start monitoring the PDCCH at the PO, each terminal having the same PO as the terminal detects the WUS before the PO, thereby causing a "false alarm" of the terminals, and further wasting power of the terminals.

For example, POs of 100 terminals (numbered from 0 to 99) are the same. If a network device needs to wake up the terminal numbered 0, the network device sends a WUS before the PO. The 100 terminals all will monitor the WUS before the PO. If the 100 UEs all detect the WUS, the 100 terminals are all woken up. In fact, the terminals numbered from 1 to 99 do not need to be woken up. However, the 99 terminals are woken up, thereby causing a "false alarm" and wasting power of the 99 terminals.

Therefore, how to wake up terminals with a least quantity of terminals on which a "false alarm" occurs is a technical problem that urgently needs to be resolved.

SUMMARY

This application provides a method for waking up a terminal, a terminal, and a network device, to help reduce a quantity of terminals on which a "false alarm" occurs.

According to a first aspect, a method for waking up a terminal is provided. The method includes: A terminal determines that a plurality of wake-up signals that can wake up the terminal need to be monitored for one PO, where terminals that can be woken up by different wake-up signals in the plurality of wake-up signals are not completely the same; and if the terminal detects at least one wake-up signal of the plurality of wake-up signals for the PO, the terminal monitors a downlink control channel at the PO.

It should be understood that the at least one wake-up signal herein may be one wake-up signal, or may be two or more wake-up signals.

In the method, the terminal needs to monitor the plurality of wake-up signals that can wake up the terminal for the one PO, where the terminals that can be woken up by the plurality of wake-up signals are not completely the same. Correspondingly, a network device may determine, from the plurality of wake-up signals, a target wake-up signal that needs to be sent to the terminal, and send the target wake-up signal to the terminal. In this way, the network device may send a target wake-up signal based on a terminal that needs to be woken up. For example, if only some terminals need to be woken up, the network device may select a wake-up signal for the some terminals as a target wake-up signal, so that as few other terminals as possible may monitor the target wake-up signal except the some terminals. Therefore, a quantity of other terminals that do not need to be woken up but are actually woken up can be reduced, that is, a quantity of terminals on which a "false alarm" occurs can be reduced.

With reference to the first aspect, in a first possible implementation, the plurality of wake-up signals that need to be monitored by the terminal include a dedicated wake-up signal corresponding to a terminal group to which the terminal belongs, and the dedicated wake-up signal corresponding to the terminal group is used to wake up a terminal in the terminal group.

In this implementation, the terminal may monitor the dedicated wake-up signal corresponding to the terminal group, and the dedicated wake-up signal may wake up only the terminal in the terminal group, so that a terminal outside the terminal group is prevented from being woken up, thereby reducing the quantity of the terminals on which the "false alarm" occurs.

With reference to the first possible implementation, in a second possible implementation, the terminal belongs to only one terminal group.

In other words, the plurality of wake-up signals that need to be monitored by the terminal may include only one dedicated wake-up signal corresponding to the terminal group, thereby helping reduce power consumption of the terminal.

With reference to the first possible implementation, in a third possible implementation, the terminal belongs to a plurality of terminal groups. It should be understood that the plurality of terminal groups herein may be two terminal groups, or may be more than two terminal groups.

In other words, the plurality of wake-up signals that need to be monitored by the terminal may include a dedicated wake-up signal corresponding to each terminal group in the plurality of terminal groups. This helps avoid a case in which the network device needs to send a dedicated wake-up signal corresponding to each terminal group in a plurality of terminal groups when another terminal that needs to be woken up by the network device and the terminal do not belong to a same terminal group, thereby saving a communication resource of the network device.

With reference to the third possible implementation, in a fourth possible implementation, a first terminal group in the plurality of terminal groups to which the terminal belongs includes terminals in a plurality of or all other terminal groups in the plurality of terminal groups.

The plurality of other terminal groups described herein may be two other terminal groups, or may be more than two other terminal groups.

With reference to the first aspect or any one of the foregoing possible implementations, in a fifth possible implementation, the plurality of wake-up signals that need to be monitored by the terminal include a first common wake-up signal, the first common wake-up signal is used to wake up a first-type terminal, and the first-type terminal is a terminal that needs to monitor a plurality of wake-up signals for the PO.

In this implementation, the terminal may monitor the first common wake-up signal, so that when the network device needs to wake up a plurality of terminals that belong to different terminal groups, the network device may send the first common wake-up signal, thereby saving the communication resource of the network device.

The terminal may be understood as a first-type terminal.

With reference to the first aspect or any one of the foregoing possible implementations, in a sixth possible implementation, the plurality of wake-up signals that need to be monitored by the terminal include a second common wake-up signal, the second common wake-up signal is used to wake up a second-type terminal, and the second-type terminal is a terminal that needs to monitor one wake-up signal for the PO.

In this implementation, the terminal may monitor the second common wake-up signal, so that when the network device needs to wake up both the terminal and the second-type terminal, the network device may send only the second common wake-up signal, thereby saving the communication resource of the network device.

With reference to the first aspect or any one of the first to the sixth possible implementations, in a seventh possible implementation, the method further includes: The terminal receives indication information, where the indication information is used to indicate that the terminal needs to monitor the plurality of wake-up signals; or the indication information is used to indicate one or more wake-up signals that do not need to be monitored by the terminal.

According to a second aspect, a method for waking up a terminal is provided. The method includes: A network device determines a plurality of wake-up signals that can wake up a to-be-woken-up terminal for one PO, where terminals that can be woken up by different wake-up signals in the plurality of wake-up signals are not completely the same; the network device determines a target wake-up signal of the to-be-woken-up terminal from the plurality of wake-up signals; and the network device sends the target wake-up signal before the PO.

In the method, the network device may select the target wake-up signal from the plurality of wake-up signals that can wake up the to-be-woken-up terminal for the one PO, so that the network device may choose to send, for the one PO of the to-be-woken-up terminal, the wake-up signal used to wake up the to-be-woken-up terminal instead of a wake-up signal used to wake up all terminals, thereby reducing a quantity of terminals on which a "false alarm" occurs.

With reference to the second aspect, in a first possible implementation, the plurality of wake-up signals include a dedicated wake-up signal corresponding to a terminal group to which the to-be-woken-up terminal belongs, and the dedicated wake-up signal corresponding to the terminal group is used to wake up a terminal in the terminal group.

In this implementation, when the network device needs to wake up the to-be-woken-up terminal, the network device only needs to send the dedicated wake-up signal corresponding to a terminal group to which the terminal belongs, and does not need to wake up all terminals, thereby reducing the quantity of the terminals on which the "false alarm" occurs.

With reference to the first possible implementation, in a second possible implementation, the to-be-woken-up terminal belongs to only one terminal group.

In other words, different terminal groups in a plurality of terminal groups include different terminals.

With reference to the first possible implementation, in a third possible implementation, the to-be-woken-up terminal belongs to two or more terminal groups.

In other words, in a plurality of terminal groups, at least two terminal groups include one or more same terminals.

In this way, when the network device needs to wake up different terminals in different scenarios, the network device may send a relatively small quantity of wake-up signals, thereby reducing the quantity of the terminals on which the "false alarm" occurs and saving a communication resource of the network device.

With reference to the first possible implementation, in a fourth possible implementation, a first terminal group to which the to-be-woken-up terminal belongs includes terminals in a plurality of or all other terminal groups.

In other words, at least one terminal group of a plurality of terminal groups includes all terminals in a plurality of other terminal groups.

That is, some terminal groups may include terminals in a plurality of other terminal groups. In this way, when the network device needs to wake up a relatively large quantity of terminals, a quantity of wake-up signals sent by the network device can be reduced, thereby saving a communication resource of the network device.

With reference to the second aspect or any one of the foregoing possible implementations, in a fifth possible implementation, the plurality of wake-up signals include a first common wake-up signal, the first common wake-up signal is used to wake up a first-type terminal, and the first-type terminal is a terminal that needs to monitor a plurality of wake-up signals for the PO.

In this way, when the network device needs to wake up a plurality of first-type terminals that belong to different terminal groups, the network device only needs to send the first common wake-up signal, thereby saving the communication resource of the network device.

With reference to the second aspect or any one of the foregoing possible implementations, in a sixth possible implementation, the plurality of wake-up signals include a second common wake-up signal, the second common wake-up signal is used to wake up a second-type terminal, and the second-type terminal is a terminal that needs to monitor one wake-up signal for the PO.

In this way, the network device may further wake up the second-type terminal.

With reference to the second aspect or any one of the foregoing possible implementations, in a seventh possible implementation, the method further includes: The network device sends indication information to the to-be-woken-up terminal, where the indication information is used to indicate that the to-be-woken-up terminal needs to monitor the plurality of wake-up signals, or the indication information is used to indicate one or more wake-up signals that do not need to be monitored by the to-be-woken-up terminal.

According to a third aspect, this application provides a terminal. The terminal includes a processing module and a receiving module.

The processing module determines that a plurality of wake-up signals that can wake up the terminal need to be monitored for one PO, where terminals that can be woken up by the plurality of wake-up signals are not completely the same. The receiving module monitors a wake-up signal, and monitors a downlink control channel at the PO when detecting at least one of the plurality of wake-up signals for the PO.

In some possible implementations, the plurality of wake-up signals include a dedicated wake-up signal corresponding to a terminal group to which the terminal belongs, and the dedicated wake-up signal corresponding to the terminal group is used to wake up a terminal in the terminal group.

In some possible implementations, the terminal belongs to only one terminal group, or the terminal belongs to two or more terminal groups.

In some possible implementations, a first terminal group in the two or more terminal groups includes terminals in a plurality of or all other terminal groups.

In some possible implementations, the plurality of wake-up signals include a first common wake-up signal, the first common wake-up signal is used to wake up a first-type terminal, and the first-type terminal is a terminal that needs to monitor a plurality of wake-up signals for the PO.

In some possible implementations, the plurality of wake-up signals include a second common wake-up signal, the second common wake-up signal is used to wake up a second-type terminal, and the second-type terminal is a terminal that needs to monitor one wake-up signal for the PO.

In some possible implementations, indication information is received by using the receiving module, the indication information is used to indicate that the terminal needs to monitor the plurality of wake-up signals, and the processing module determines, based on the indication information, that the plurality of wake-up signals need to be monitored for the PO.

The terminal in the third aspect or any one of the possible implementations of the third aspect may be a communications apparatus, for example, may be a chip.

The processing module and the receiving module in the third aspect or any one of the possible implementations of the third aspect may be implemented by using software and/or hardware.

An example of the processing module is a processor. An example of the receiving module is a receiver. Another example of the receiving module is a communications interface.

For example, when the terminal in the third aspect or any one of the possible implementations of the third aspect is a chip, the processing module may be a processor, and the receiving module may be a communications interface.

Optionally, the terminal in the third aspect or any one of the possible implementations of the third aspect may further include a memory, configured to store a program instruction executed by the processing module.

Optionally, the terminal in the third aspect or any one of the possible implementations of the third aspect may further include a transmitter, configured to send data or signaling. The transmitter and the receiver may be integrated together and collectively referred to as a transceiver.

According to a fourth aspect, this application provides a network device. The network device includes a processing module and a sending module.

The processing module determines a plurality of wake-up signals that can wake up a to-be-woken-up terminal for one paging occasion (PO), and determine a target wake-up signal of the to-be-woken-up terminal from the plurality of wake-up signals, where terminals that can be woken up by different wake-up signals in the plurality of wake-up signals are not completely the same; and the sending module sends the target wake-up signal before the PO.

In some possible implementations, the plurality of wake-up signals include a dedicated wake-up signal corresponding to a terminal group to which the to-be-woken-up terminal belongs, and the dedicated wake-up signal corresponding to the terminal group is used to wake up a terminal in the terminal group.

In some possible implementations, the to-be-woken-up terminal belongs to only one terminal group, or the to-be-woken-up terminal belongs to two or more terminal groups.

In some possible implementations, a first terminal group in the two or more terminal groups includes terminals in a plurality of or all other terminal groups.

In some possible implementations, the plurality of wake-up signals include a first common wake-up signal, the first common wake-up signal is used to wake up a first-type terminal, and the first-type terminal is a terminal that needs to monitor a plurality of wake-up signals for the PO.

In some possible implementations, the plurality of wake-up signals include a second common wake-up signal, the second common wake-up signal is used to wake up a second-type terminal, and the second-type terminal is a terminal that needs to monitor one wake-up signal for the PO.

In some possible implementations, indication information is sent to the to-be-woken-up terminal by using the sending module, and the indication information is used to indicate that the to-be-woken-up terminal needs to monitor the plurality of wake-up signals.

The network device in the fourth aspect or any one of the possible implementations of the fourth aspect may be a communications apparatus, for example, may be a chip.

The processing module and the sending module in the fourth aspect or any one of the possible implementations of the fourth aspect may be implemented by using software and/or hardware.

An example of the processing module is a processor. An example of the sending module is a transmitter. Another example of the sending module is a communications interface.

For example, when the network device in the fourth aspect or any one of the possible implementations of the fourth aspect is a chip, the processing module may be a processor, and the sending module may be a communications interface.

Optionally, the network device in the fourth aspect or any one of the possible implementations of the fourth aspect may further include a memory, configured to store a program instruction executed by the processing module.

Optionally, the network device in the fourth aspect or any one of the possible implementations of the fourth aspect may further include a receiver, configured to receive data or signaling. The transmitter and the receiver may be integrated together and collectively referred to as a transceiver.

According to a fifth aspect, this application provides a computer-readable storage medium. The computer-readable storage medium stores program code used to be executed by a terminal. The program code includes an instruction used to perform the method according to the first aspect or any one of the possible implementations of the first aspect.

According to a sixth aspect, this application provides a computer-readable storage medium. The computer-readable storage medium stores program code used to be executed by a network device. The program code includes an instruction used to perform the method according to the second aspect or any one of the possible implementations of the second aspect.

According to a seventh aspect, this application provides a computer program product including an instruction. When the computer program product runs on a terminal, the terminal is enabled to perform the method according to the first aspect or any one of the possible implementations of the first aspect.

According to an eighth aspect, this application provides a computer program product including an instruction. When the computer program product runs on a network device, the network device is enabled to perform the method according to the second aspect or any one of the possible implementations of the second aspect.

According to a ninth aspect, this application provides a system chip. The system chip includes an input/output interface, at least one processor, at least one memory, and a bus. The at least one memory is configured to store an instruction, and the at least one processor is configured to invoke the instruction in the at least one memory, to perform operations of the method according to the first aspect or any one of the possible implementations of the first aspect.

According to a tenth aspect, this application provides a system chip. The system chip includes an input/output interface, at least one processor, at least one memory, and a bus. The at least one memory is configured to store an instruction, and the at least one processor is configured to invoke the instruction in the at least one memory, to perform operations of the method according to the second aspect or any one of the possible implementations of the second aspect.

According to an eleventh aspect, this application provides a communications system. The communications system includes the terminal according to the third aspect and/or the network device according to the fourth aspect.

DETAILED DESCRIPTION OF ILLUSTRATIVE EMBODIMENTS

The following describes the technical solutions of this application with reference to accompanying drawings.

Figure 1:
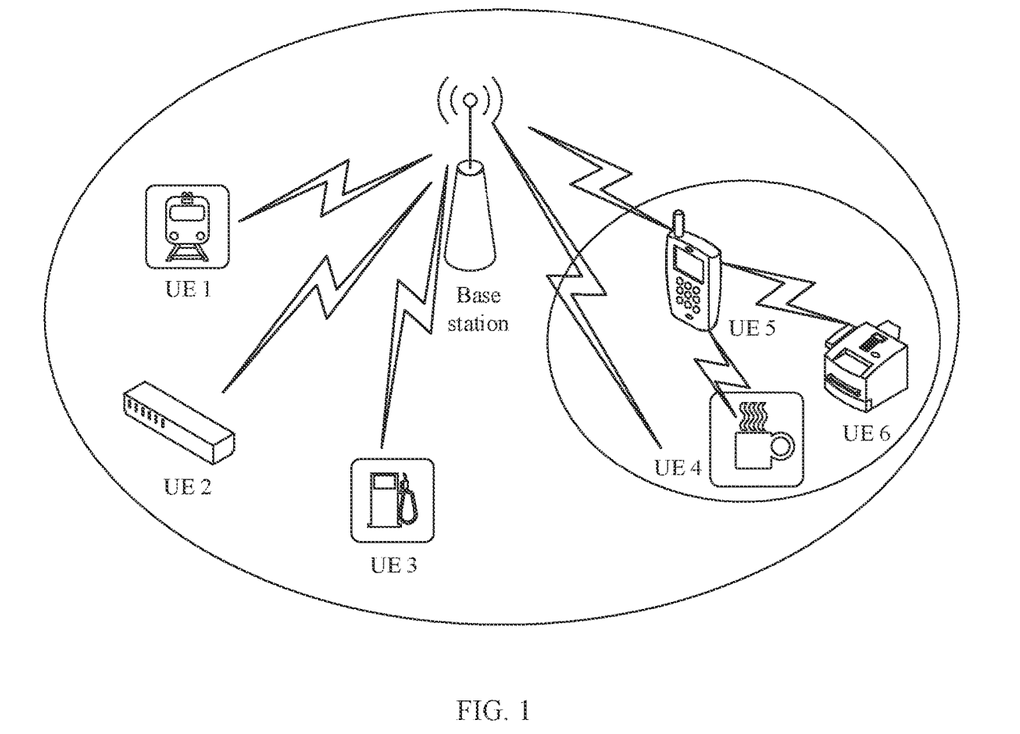
FIG. 1 is a schematic architectural diagram of a communications system to which a method according to an embodiment of this application may be applied.

FIG. 1 is an example schematic architectural diagram of a communications system according to an embodiment of this application. A method according to an embodiment of this application may be applied to the communications system shown in FIG. 1. It should be understood that the communications system to which the method in the embodiments of this application may be applied may include more or fewer network elements or devices.

The devices or the network elements in FIG. 1 may be hardware, or may be software obtained through functional division, or a combination thereof. The devices or the network elements in FIG. 1 may communicate with each other through another device or network element.

In the communications system shown in FIG. 1, a base station and UE 1 to UE 6 form a communications system. In this communications system, the base station may send downlink data to the UE 1 to the UE 6. Certainly, the UE 1 to the UE 6 may also send uplink data to the base station.

In addition, the UE 4 to the UE 6 may also form a communications system. In this communications system, the base station may send downlink information to the UE 1, UE 2, UE 3, UE 4, and UE 5, and the UE 5 may also send downlink information to the UE 4 and the UE 6.

The communications system shown in FIG. 1 may be a global system for mobile communications (global system of mobile communication, GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, a new radio (NR) or an IoT communications system, or the like.

The UE in the embodiments of this application may be referred to as user equipment, an access terminal, a subscriber unit, a subscriber station, a mobile station, a mobile console, a remote station, a remote terminal, a mobile device, a user terminal, a terminal device, a wireless communications device, a user agent, a user apparatus, or the like. A terminal device may also be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a smart electricity meter, a smart water meter, a medical device, a logistics device, an industrial device, a transportation device, a terminal device in a future 5G network, a terminal device in a future evolved public land mobile network (PLMN), or the like. This is not limited in the embodiments of this application.

A network device in the embodiments of this application may be a device configured to communicate with a terminal device. The network device may be a base transceiver station (base transceiver station, BTS) in a global system for mobile communications (GSM) or a code division multiple access (CDMA) system, or may be a NodeB (NB) in a wideband code division multiple access (WCDMA) system, or may be an evolved NodeB (eNB or eNodeB) in an LTE system, or may be a radio controller in a scenario of a cloud radio access network (CRAN). Alternatively, the network device may be a relay node, an access point, a vehicle-mounted device, a wearable device, a network device in a future 5G network, a network device in a future evolved PLMN network, or the like. This is not limited in the embodiments of this application.

A wake-up signal in the embodiments of this application is used to indicate whether a terminal needs to be woken up at a PO to receive and monitor (or listen to) a PDCCH.

Normally, if the network device sends the PDCCH at the PO, for example, when the terminal needs to be paged or a system message changes, the network device may send the wake-up signal before the PO, to wake up the terminal to monitor or listen to the PDCCH at the PO. If the network device does not send the PDCCH at the PO of the terminal, the network device may not send the wake-up signal. In this way, the UE does not wake up to monitor or listen to the PDCCH at the PO.

In the embodiments of this application, "a plurality of" refers to "two" or "more than two". In the embodiments of this application, "at least one" may refer to "one" or "a plurality of".

Figure 2:
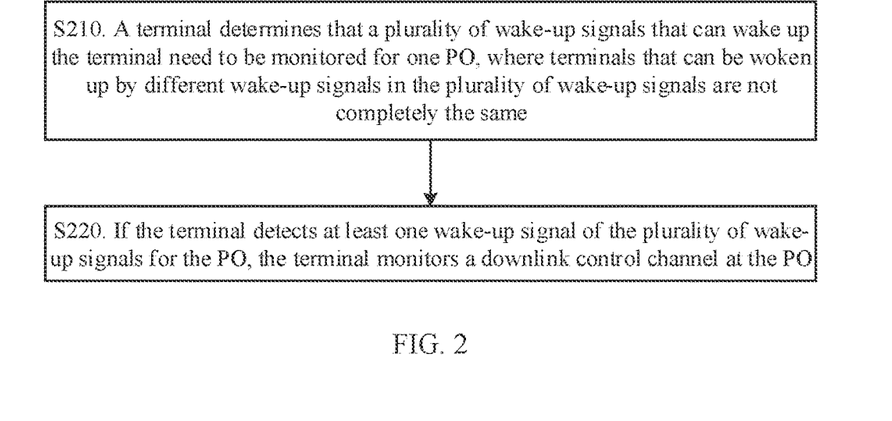
FIG. 2 is a schematic flowchart of a method for waking up a terminal according to an embodiment of this application.

FIG. 2 is a schematic flowchart of a method for waking up a terminal according to an embodiment of this application. It should be understood that FIG. 2 shows steps or operations of the method, but the steps or operations are merely examples. In this embodiment of this application, other operations or variations of the operations in FIG. 2 may be further performed. The method shown in FIG. 2 may be performed by the UE 1 to the UE 6 shown in FIG. 1.

S210. A terminal determines that a plurality of wake-up signals that can wake up the terminal need to be monitored for one PO, where terminals that can be woken up by different wake-up signals in the plurality of wake-up signals are not completely the same.

For example, it is preconfigured in configuration information of the terminal that the terminal supports a plurality of wake-up signals. That the terminal supports a plurality of wake-up signals may be understood as that each of the plurality of wake-up signals can wake up the terminal. In this way, the terminal may determine, based on the configuration information, that the plurality of wake-up signals that can wake up the terminal need to be monitored for the one PO.

Alternatively, the terminal may determine the plurality of wake-up signals that need to be monitored for the one PO. It should be understood that each of the plurality of wake-up signals that need to be monitored by the terminal for the one PO can wake up the terminal. In other words, the terminal determines the wake-up signals that need to be monitored for the one PO so as to wake up the terminal.

For example, the wake-up signals supported by the terminal may be preconfigured in the configuration information of the terminal. The terminal may determine, based on the configuration information, the wake-up signals supported by the terminal as the plurality of wake-up signals that need to be monitored by the terminal.

Further, sequence information of each of the plurality of wake-up signals supported by the terminal may be preconfigured in the configuration information of the terminal. For example, a sequence of the wake-up signal may include a Zadoff-Chu (ZC) sequence, an M sequence, a Gold sequence, and the like. The sequence information of the wake-up signal may include a formula or an algorithm for generating the sequence of the wake-up signal, and a related parameter.

Sequence information of different wake-up signals in the plurality of wake-up signals is different. The terminal may determine, based on the configuration information, the sequence information of each of the plurality of wake-up signals supported by the terminal as sequence information of each of the plurality of wake-up signals that need to be monitored by the terminal.

S220. If the terminal detects at least one wake-up signal of the plurality of wake-up signals for the PO, the terminal monitors a downlink control channel at the PO.

For example, the terminal may sequentially generate, based on the sequence information of each wake-up signal that needs to be monitored by the terminal, a sequence of each wake-up signal, and compare the sequence with a sequence of a wake-up signal sent by a network device for the PO. If a comparison result is that the sequences are consistent, the terminal may determine that the compared wake-up signal in the plurality of wake-up signals that need to be monitored by the terminal is detected.

The terminal may detect the at least one wake-up signal, included in all wake-up signals sent by the network device for the PO, of the plurality of wake-up signals that need to be monitored by the terminal, and then wake up at the PO to monitor the PDCCH.

However, usually, to reduce power consumption of monitoring a wake-up signal by the terminal, when the terminal detects, in the wake-up signals sent by the network device for the PO, one of the plurality of wake-up signals that need to be monitored by the terminal, the terminal may stop monitoring a wake-up signal, and wake up at the PO to monitor the PDCCH.

If the terminal does not detect, in the wake-up signals sent by the network device for the PO, any one of the plurality of wake-up signals that need to be monitored by the terminal device, the terminal may not wake up at the paging occasion to monitor the PDCCH.

In this embodiment of this application, the terminal needs to monitor, for the one PO, the plurality of wake-up signals that can wake up the terminal, where the terminals that can be woken up by the plurality of wake-up signals are not completely the same. Correspondingly, the network device may determine, from the plurality of wake-up signals, a target wake-up signal that needs to be sent to the terminal, and send the target wake-up signal to the terminal. In this way, the network device may send a target wake-up signal based on a terminal that needs to be woken up. For example, if only some terminals need to be woken up, the network device may select a wake-up signal for the some terminals as a target wake-up signal, so that as few other terminals as possible may detect the target wake-up signal except the some terminals. Therefore, a quantity of other terminals that do not need to be woken up but are actually woken up can be reduced, that is, a quantity of terminals on which a "false alarm" occurs can be reduced.

In some possible implementations, the plurality of wake-up signals that need to be monitored by the terminal may include a first common wake-up signal. The first common wake-up signal is used to wake up a first-type terminal. The first-type terminal is a terminal that needs to monitor a plurality of wake-up signals.

Certainly, the plurality of wake-up signals that need to be monitored by the terminal may further include another wake-up signal, for example, may further include a second common wake-up signal and/or a dedicated wake-up signal corresponding to a terminal group to which the terminal belongs that is/are described in subsequent content.

In this way, when the network device needs to wake up a plurality of first-type terminals, for example, when the network device needs to wake up all first-type terminals, the network device may send only the first common wake-up signal, thereby saving a communication resource of the network device.

The communications system shown in FIG. 1 is used as an example. The first common wake-up signal is used to wake up the UE 1 to the UE 6. In other words, each of the UE 1 to the UE 6 can detect the first common wake-up signal, and after detecting the first common wake-up signal, all of the UE 1 to the UE 6 wake up at a paging occasion to monitor a downlink control channel. A plurality of wake-up signals that need to be monitored by each of the UE 1 to the UE 6 include the first common wake-up signal. In this way, when the base station needs to wake up all UEs from the UE 1 to the UE 6, the base station only needs to send the first common wake-up signal. Each of the UE 1 to the UE 6 monitors the first common wake-up signal.

In some possible implementations, the plurality of wake-up signals that need to be monitored by the terminal may include the second common wake-up signal. The second common wake-up signal is used to wake up a second-type terminal. The second-type terminal is a terminal that needs to monitor one wake-up signal.

Certainly, the plurality of wake-up signals that need to be monitored by the terminal may further include another wake-up signal, for example, may further include the first common wake-up signal and/or the dedicated wake-up signal corresponding to the terminal group to which the terminal belongs that is described in subsequent content.

That the plurality of wake-up signals that need to be monitored by the terminal may include the second common wake-up signal means that the terminal may monitor a wake-up signal that is originally used to wake up the second-type terminal, and may wake up to monitor the downlink control channel when detecting the second common wake-up signal.

In this implementation, when the network device needs to wake up the first-type terminal and the second-type terminal, the network device may send only the second common wake-up signal, thereby saving the communication resource of the network device.

The communications system shown in FIG. 1 is used as an example. If the UE 1 to the UE 3 are first-type terminals, and the UE 4 to the UE 6 are second-type terminals, a plurality of wake-up signals that need to be monitored by each of the UE 1 to the UE 3 may include the first common wake-up signal and the second common wake-up signal. In this way, when the base station needs to wake up all UEs from the UE 1 to the UE 6, the base station only needs to send the second common wake-up signal. Each of the UE 1 to the UE 6 monitors the second common wake-up signal.

In some other possible implementations, the plurality of wake-up signals that need to be monitored by the terminal may include the dedicated wake-up signal corresponding to the terminal group to which the terminal belongs. The dedicated wake-up signal corresponding to the terminal group to which the terminal belongs is used to wake up a terminal in the terminal group. A terminal outside the terminal group does not monitor the dedicated wake-up signal corresponding to the terminal group. Certainly, the plurality of wake-up signals that need to be monitored by the terminal may further include another wake-up signal, for example, may further include the first common wake-up signal and/or the second common wake-up signal.

Sequence information of the dedicated wake-up signal corresponding to the terminal group may be in a one-to-one correspondence with a group number of the terminal group. For example, sequence information of a dedicated wake-up signal corresponding to each terminal group may include a formula (algorithm) used to generate a dedicated wake-up signal and a group number of a terminal group. In this way, when monitoring a wake-up signal, the terminal may generate a sequence of the dedicated wake-up signal based on the group number of the terminal group and the formula in the sequence information of the dedicated wake-up signal corresponding to each terminal group, and compare the signaling with a sequence of the wake-up signal sent by the network device, to determine whether the terminal needs to be woken up.

Because group numbers of terminal groups in sequence information of dedicated wake-up signals corresponding to different terminal groups are different, a sequence generated by a terminal in another terminal group based on sequence information of a dedicated wake-up signal corresponding to the terminal group to which the terminal belongs is different from the sequence of the dedicated wake-up signal that is sent by the network device and that is used to wake up the current to-be-woken-up terminal. Therefore, the terminals in the another terminal group do not successfully monitor the dedicated wake-up signal corresponding to the terminal group to which the current to-be-woken-up terminal belongs, so that when the network device sends the dedicated wake-up signal corresponding to the terminal group to which the current to-be-woken-up terminal belongs to wake up the to-be-woken-up terminal, the terminals in the another terminal group may not be woken up, thereby reducing the quantity of the terminals on which the "false alarm" occurs.

In this implementation, when the network device needs to wake up the terminal, the network device may send only the dedicated wake-up signal corresponding to the terminal group to which the terminal belongs. In this way, the terminal that does not belong to the terminal group is not woken up, thereby reducing the quantity of the terminals on which the "false alarm" occurs.

Optionally, the terminal may belong to only one terminal group, or may belong to a plurality of terminal groups.

That the terminal may belong to only one terminal group may be understood as that none of terminals included in the terminal group to which the terminal belongs is the same as terminals included in any other terminal group.

This terminal grouping manner may be referred to as orthogonal grouping, that is, terminals in any two terminal groups are different from each other.

When the terminal belongs to the only one terminal group, the plurality of wake-up signals that need to be monitored by the terminal may include the first common wake-up signal and one dedicated wake-up signal, and the dedicated wake-up signal is a dedicated wake-up signal corresponding to a terminal group to which the terminal belongs.

The communications system shown in FIG. 1 is used as an example. The UE 1 and the UE 4 are grouped into a first terminal group, the UE 2 and the UE 5 are grouped into a second terminal group, and the UE 3 and the UE 6 are grouped into a third terminal group. Terminals included in any two of the three terminal groups are different. A plurality of wake-up signals that need to be monitored by each of the UE 1 to the UE 6 include a dedicated wake-up signal corresponding to a terminal group to which each of the UE 1 to the UE 6 belongs.

In this way, when the base station needs to wake up the UE 1, the base station may send only a dedicated wake-up signal corresponding to the first terminal group, so as to wake up the UE 1 and the UE 4. In this case, a "false alarm" occurs on only the UE 4 but does not occur on other UEs, that is, a quantity of terminals on which the "false alarm" occurs is reduced.

That the terminal may belong to a plurality of terminal groups may be understood as that the plurality of terminal groups to which the terminal belongs include at least one same terminal. This terminal grouping manner may be referred to as non-orthogonal grouping.

When the terminal belongs to the plurality of terminal groups, the plurality of signals that need to be monitored by the terminal may include a plurality of dedicated wake-up signals. The plurality of dedicated wake-up signals are in a one-to-one correspondence with the plurality of terminal groups, and different dedicated wake-up signals correspond to different terminal groups. In other words, different terminal groups correspond to different dedicated wake-up signals.

That the plurality of dedicated wake-up signals are in a one-to-one correspondence with the plurality of terminal groups may be understood as that the plurality of dedicated wake-up signals correspond to a plurality of pieces of sequence information, where the plurality of pieces of sequence information are in a one-to-one correspondence with group numbers of the plurality of terminal groups. For the correspondence between the plurality of pieces of sequence information and the group numbers of the plurality of terminal groups, refer to the foregoing content. Details are not described herein again.

That the terminal belongs to the plurality of terminal groups or the non-orthogonal terminal grouping may further reduce the quantity of the terminals on which the "false alarm" occurs.

The communications system shown in FIG. 1 is used as an example. The UE 1 and the UE 4 may be grouped into a first terminal group, the UE 2 and the UE 5 may be grouped into a second terminal group, the UE 3 and the UE 6 may be grouped into a third terminal group, and the UE 1 and the UE 2 may be grouped into a fourth terminal group.

A plurality of wake-up signals that need to be monitored by the UE 1 may include two dedicated wake-up signals, that is, a dedicated wake-up signal corresponding to the first terminal group and a dedicated wake-up signal corresponding to the fourth terminal group.

In this way, when the base station needs to wake up the UE 1 and the UE 4, the base station may send only the dedicated wake-up signal corresponding to the first terminal group; and when the base station needs to wake up the UE 1 and the UE 2, the base station may send only the dedicated wake-up signal corresponding to the fourth terminal group.

Further, one of the plurality of terminal groups to which the terminal belongs may include all terminals in a plurality of other terminal groups. In this way, the communication resource of the network device can be saved.

The communications system shown in FIG. 1 is used as an example. The UE 1 and UE 4 may be grouped into a first terminal group, the UE 2 and the UE 5 may be grouped into a second terminal group, and the UE 3 and the UE 6 may be grouped into a third terminal group. In addition, the UE 1, the UE 2, the UE 4, and the UE 5 are grouped into a fourth terminal group.

A plurality of wake-up signals that need to be monitored by the UE 1 may include two dedicated wake-up signals, that is, a dedicated wake-up signal corresponding to the first terminal group and a dedicated wake-up signal corresponding to the fourth terminal group.

When the base station needs to wake up the UE 1, the UE 2, the UE 4, and the UE 5, the base station may send only the dedicated wake-up signal corresponding to the fourth terminal group, thereby saving a communication resource; and when the base station needs to wake up the UE 1 and the UE 4, the base station may send only the dedicated wake-up signal corresponding to the first terminal group, thereby reducing a quantity of terminals on which a "false alarm" occurs.

Further, one of the plurality of terminal groups to which the terminal belongs may include all terminals in all other terminal groups. In this case, a dedicated wake-up signal corresponding to a terminal group may be equivalent to the first common wake-up signal. In other words, the plurality of wake-up signals that need to be monitored by the terminal may not include the first common wake-up signal.

The communications system shown in FIG. 1 is used as an example. The UE 1 and UE 4 may be grouped into a first terminal group, the UE 2 and the UE 5 may be grouped into a second terminal group, and the UE 3 and the UE 6 may be grouped into a third terminal group. In addition, the UE 1, the UE 2, the UE 3, the UE 4, the UE 5, and the UE 6 are grouped into a fourth terminal group.

When the base station needs to wake up all UEs, the base station may send only a dedicated wake-up signal corresponding to the fourth terminal group, thereby saving a communication resource.

In the method in this embodiment of this application, optionally, the method may further include: The terminal receives indication information, where the indication information is used to indicate that the terminal needs to monitor the plurality of wake-up signals; or the indication information is used to indicate the plurality of wake-up signals that need to be monitored by the terminal.

For example, the terminal may report, to the network device, a plurality of wake-up signals supported by the terminal. Then, the network device may determine, based on requirements of all terminals managed or served by the network device on a wake-up signal and a capability of the terminal for detecting a wake-up signal, the wake-up signals that actually need to be monitored by the terminal.

For example, if terminals managed or served by the network device include both the first-type terminal and the second-type terminal, the network device may determine that the first-type terminal needs to monitor a plurality of wake-up signals, that is, needs to monitor the first common wake-up signal and the second common wake-up signal.

For another example, if terminals managed or served by the network device include the first-type terminal and the second-type terminal, and all the first-type terminals are grouped into a plurality of orthogonal groups based on a service of each first-type terminal, it may be determined that each first-type terminal needs to monitor a plurality of wake-up signals, that is, needs to monitor the first common wake-up signal, the second common wake-up signal and a dedicated wake-up signal corresponding to a terminal group to which the first-type terminal belongs.

After determining the wake-up signals that actually need to be monitored by the terminal, the network device may send the indication information to the terminal, to indicate the wake-up signals that need to be monitored by the terminal.

Alternatively, the network device may send the indication information to the terminal to indicate the plurality of wake-up signals that need to be monitored by the terminal. The terminal may determine, based on the indication information, the plurality of wake-up signals that need to be monitored.

Further, the indication information may be used to indicate the sequence information of each of the plurality of wake-up signals that need to be monitored by the terminal. The terminal may determine, based on the indication information, the sequence information of each of the plurality of wake-up signals that need to be monitored.

In some implementations, the sequence information corresponding to one or more of the plurality of wake-up signals supported by the terminal has been respectively configured in the configuration information of the terminal. Then, the terminal may report, to the network device, the wake-up signals supported by the terminal.

For example, the terminal may report, to the network device, that the plurality of wake-up signals supported by the terminal are the first common wake-up signal and the second common wake-up signal.

For another example, the terminal may report, to the network device, that the plurality of wake-up signals supported by the terminal are the first common wake-up signal, the second common wake-up signal, and the dedicated wake-up signal corresponding to the terminal group to which the terminal belongs.

For another example, the terminal may report, to the network device, that the plurality of wake-up signals supported by the terminal are the second common wake-up signal and the dedicated wake-up signal corresponding to the terminal group to which the terminal belongs.

For another example, the terminal may report, to the network device, that the plurality of wake-up signals supported by the terminal are the first common wake-up signal and the dedicated wake-up signal corresponding to the terminal group to which the terminal belongs.

In this way, the network device may determine, based on the wake-up signals that is reported by the terminal and that is supported by the terminal and a requirement of the terminal for the wake-up signal, the wake-up signals need to be monitored by each terminal.

For example, when the terminal reports, to the network device, that the plurality of wake-up signals supported by the terminal are the first common wake-up signal, the second common wake-up signal, and the dedicated wake-up signal corresponding to the terminal group to which the terminal belongs, if all terminals served or managed by the network device include both the first-type terminal and the second-type terminal, and all the first-type terminals may be grouped into a plurality of orthogonal groups based on services of all the first-type terminals, the network device may determine that each first-type terminal needs to monitor a plurality of wake-up signals, and may send the indication information to the first-type terminal, to indicate that the first-type terminal needs to monitor the plurality of wake-up signals. The terminal may determine, based on the indication information, that the plurality of wake-up signals need to be monitored, and can determine that the plurality of wake-up signals that need to be monitored are the first common wake-up signal, the second common wake-up signal, and the dedicated wake-up signal corresponding to the terminal group to which the terminal belongs. The network device may further send, to the terminal, the sequence information of the dedicated wake-up signal corresponding to the terminal group to which the terminal belongs.

Alternatively, the network device may send the indication information to the first-type terminal, to directly indicate that the plurality of wake-up signals that need to be monitored by the first-type terminal are the first common wake-up signal, the second common wake-up signal, and the dedicated wake-up signal corresponding to the terminal group to which the terminal belongs.

Certainly, the network device may alternatively determine wake-up signals that do not need to be monitored by the terminal, and send the indication information to the terminal device, to indicate the wake-up signals that do not need to be monitored by the terminal device. The terminal determines, based on the indication information and the plurality of wake-up signals supported by the terminal, the wake-up signals that need to be monitored by the terminal.

If the terminal does not receive any of the foregoing indication information from the network device, the terminal may determine that all the wake-up signals indicated by the terminal need to be monitored.

In this embodiment of this application, terminals may be grouped based on service requirements of the terminals. For example, terminals with a same service requirement may be grouped into a same terminal group.

Alternatively, terminals may be grouped based on identifiers of the terminals and a quantity of groups that need to be obtained through grouping, that is, terminals are randomly grouped. For example, when the terminals need to be grouped into N terminal groups, a modulo operation may be performed on N by using the identifiers of the terminals, and terminals with a same remainder may be grouped into a same terminal group.

The UE 1 to the UE 6 in FIG. 1 are used as an example. Assuming that identifiers of the UE 1, the UE 2, the UE 3, the UE 4, the UE 5, and the UE 6 are respectively 1, 2, 3, 4, 5, and 6, and the UE 1 to the UE 6 need to be divided into three groups, 1, 2, 3, 4, 5, and 6 may modulo 3 separately. Remainders obtained after 1 and 4 modulo 3 are both 1, so the UE 1 and the UE 4 may be grouped into one terminal group. Remainders obtained after 2 and 5 modulo 3 are both 2, so the UE 2 and the UE 5 may be grouped into one terminal group. Remainders obtained after 3 and 6 modulo 3 are both 3, so the UE 3 and the UE 6 may be grouped into one terminal group.

Figure 3:
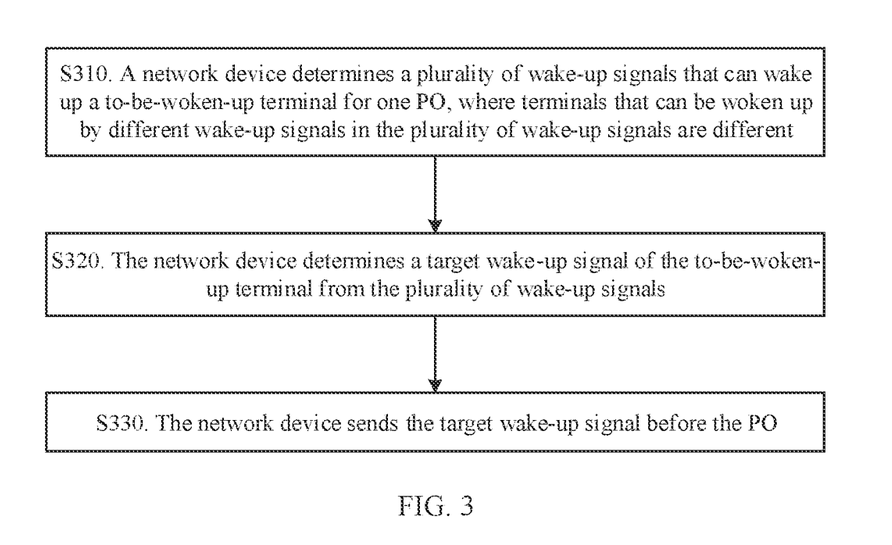
FIG. 3 is a schematic flowchart of a method for waking up a terminal according to another embodiment of this application.

FIG. 3 is a schematic flowchart of a method for waking up a terminal according to an embodiment of this application. It should be understood that FIG. 3 shows steps or operations of the method, but the steps or operations are merely examples. In this embodiment of this application, other operations or variations of the operations in FIG. 3 may be further performed. The method shown in FIG. 3 may be performed by the base station shown in FIG. 1.

S310. A network device determines a plurality of wake-up signals that can wake up a to-be-woken-up terminal for one PO, where terminals that can be woken up by different wake-up signals in the plurality of wake-up signals are different.

For example, the to-be-woken-up terminal may report, to the network device, a plurality of wake-up signals supported by the to-be-woken-up terminal for the one PO. It should be understood that each of the plurality of wake-up signals supported by the to-be-woken-up terminal can wake up the to-be-woken-up terminal.

The network device may determine, based on information reported by the to-be-woken-up terminal, the wake-up signals that may be actually used to wake up the to-be-woken-up terminal.

For example, the to-be-woken-up terminal reports, to the network device, that the to-be-woken-up terminal can support a first common wake-up signal, a second common wake-up signal, and a dedicated wake-up signal corresponding to a terminal group to which the to-be-woken-up terminal belongs. When finding that terminals managed or served by the network device include only a first-type terminal, the network device may determine that the plurality of wake-up signals that can be used to wake up the to-be-woken-up terminal may be the first common wake-up signal and the dedicated wake-up signal corresponding to the terminal group to which the to-be-woken-up terminal belongs.

The to-be-woken-up terminal may be the terminal in the communication method shown in FIG. 2.

S320. The network device determines a target wake-up signal of the to-be-woken-up terminal from the plurality of wake-up signals.

For example, when the to-be-woken-up terminal includes the first-type terminal and a second-type terminal, the target wake-up signal may include the first common wake-up signal, or the target wake-up signal may include the first common wake-up signal and the second common wake-up signal, where the first common wake-up signal is used to wake up the first-type terminal, and the second common wake-up signal is used to wake up the second-type terminal. The first-type terminal is a terminal that needs to monitor a plurality of wake-up signals, and the second-type terminal is a terminal that needs to monitor one wake-up signal.

For example, first-type terminals served or managed by the network device may be grouped into at least one terminal group, each terminal group in the at least one terminal group has a corresponding dedicated wake-up signal, and a dedicated wake-up signal corresponding to each terminal group is only used to wake up a terminal in the terminal group.

If there are a plurality of to-be-woken-up terminals, and the plurality of to-be-woken-up terminals belong to a same terminal group in the plurality of terminal groups, the target wake-up signal may include a dedicated wake-up signal corresponding to a same terminal group.

If the to-be-woken-up terminal includes a plurality of first-type terminals, and the plurality of first-type terminals include different terminals of at least two terminal groups in the plurality of terminal groups, the target wake-up signal may include the second common wake-up signal.

If the to-be-woken-up terminal includes a plurality of first-type terminals, and the plurality of first-type terminals include different terminals of at least two terminal groups in the plurality of terminal groups, the target wake-up signal may include a dedicated wake-up signal corresponding to each terminal group of the at least two terminal groups.

In this embodiment of this application, optionally, when determining to send a system message, the network device may determine all terminals served or managed by the network device as to-be-woken-up terminals. In this case, if the first-type terminal can support the second common wake-up signal, the target wake-up signal may be the second common wake-up signal. If the first-type terminal cannot support the second common wake-up signal, the target wake-up signal may be the first common wake-up signal and the second common wake-up signal. If all first-type terminals are grouped into one terminal group, the target wake-up signal may be the second wake-up signal and a dedicated wake-up signal corresponding to the terminal group.

S330. The network device sends the target wake-up signal before the PO.

In this embodiment of this application, the network device may send a plurality of wake-up signals. Further, terminals that can be woken up by the plurality of wake-up signals are different. In this way, the network device may send a wake-up signal based on a terminal that needs to be woken up, so that a quantity of other terminals that do not need to be woken up but are actually woken up can be reduced, that is, a quantity of terminals on which a "false alarm" occurs can be reduced.

In this embodiment of this application, when terminals are grouped into a plurality of terminal groups, different terminal groups may include different terminals. In other words, terminals in any two terminal groups are different from each other. This terminal grouping manner may be referred to as orthogonal grouping.

The communications system shown in FIG. 1 is used as an example. The UE 1 and the UE 4 are grouped into a first terminal group, the UE 2 and the UE 5 are grouped into a second terminal group, and the UE 3 and the UE 6 are grouped into a third terminal group. Terminals included in any two of the three terminal groups are different.

In this way, when the base station needs to wake up the UE 1, the base station may send only a dedicated wake-up signal corresponding to the first terminal group, so as to wake up the UE 1 and the UE 4. In this case, only the UE 4 has a "false alarm", and other UEs do not have a "false alarm", that is, a quantity of terminals on which the "false alarm" occurs is reduced.

Optionally, when a plurality of terminals are grouped into a plurality of terminal groups, at least two terminal groups may include one or more same terminals. This terminal grouping manner may be referred to as non-orthogonal grouping.

The non-orthogonal grouping can further reduce the quantity of the terminals on which the "false alarm" occurs.

The communications system shown in FIG. 1 is used as an example. The UE 1 and the UE 4 may be grouped into a first terminal group, the UE 2 and the UE 5 may be grouped into a second terminal group, the UE 3 and the UE 6 may be grouped into a third terminal group, and the UE 1 and the UE 2 may be grouped into a fourth terminal group.

In this way, when the base station needs to wake up the UE 1 and the UE 4, the base station may send only a dedicated wake-up signal corresponding to the first terminal group; and when the base station needs to wake up the UE 1 and the UE 2, the base station may send only a dedicated wake-up signal corresponding to the terminal group the fourth terminal group.

Further, at least one terminal group in the plurality of terminal groups that are grouped may include all terminals in a plurality of other terminal groups. In this way, a communication resource of the network device can be saved.

The communications system shown in FIG. 1 is used as an example. The UE 1 and UE 4 may be grouped into a first terminal group, the UE 2 and the UE 5 may be grouped into a second terminal group, and the UE 3 and the UE 6 may be grouped into a third terminal group. In addition, the UE 1, the UE 2, the UE 4, and the UE 5 are grouped into a fourth terminal group.

When the base station needs to wake up the UE 1, the UE 2, the UE 4, and the UE 5, the base station may send only a dedicated wake-up signal corresponding to the fourth terminal group, thereby saving a communication resource; and when the base station needs to wake up the UE 1 and the UE 4, the base station may send only a dedicated wake-up signal corresponding to the first terminal group, thereby reducing a quantity of terminals on which a "false alarm" occurs.

Further, at least one terminal group in the plurality of terminal groups that are grouped may include all terminals in all other terminal groups. In this case, a dedicated wake-up signal corresponding to the terminal group may be equivalent to the first common wake-up signal. In other words, the plurality of wake-up signals may not include the first common wake-up signal.

The communications system shown in FIG. 1 is used as an example. The UE 1 and UE 4 may be grouped into a first terminal group, the UE 2 and the UE 5 may be grouped into a second terminal group, and the UE 3 and the UE 6 may be grouped into a third terminal group. In addition, the UE 1, the UE 2, the UE 3, the UE 4, the UE 5, and the UE 6 are grouped into a fourth terminal group.

When the base station needs to wake up all UEs, the base station may send only a dedicated wake-up signal corresponding to the fourth terminal group, thereby saving a communication resource.

It should be understood that a same concept in the method shown in FIG. 3 and the method shown in FIG. 2 has a same meaning, and details are not described herein again.

Figure 4:
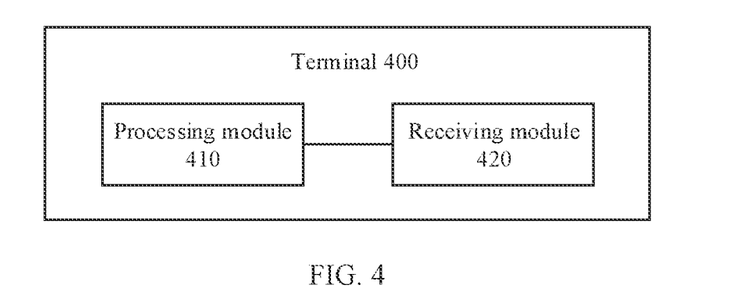
FIG. 4 is a schematic structural diagram of a terminal according to an embodiment of this application.

FIG. 4 is a schematic structural diagram of a terminal according to an embodiment of this application. It should be understood that a terminal 400 shown in FIG. 4 is merely an example. The terminal in this embodiment of this application may further include another module or unit, or include modules with functions similar to those of the modules in FIG. 4, or may not necessarily include all modules in FIG. 4.

The terminal 400 may be configured to perform the steps performed by the terminal in the method shown in FIG. 2. For example, the terminal 400 may include a processing module 410 and a receiving module 420.

The processing module 410 determines that a plurality of wake-up signals that can wake up the terminal need to be monitored for one paging occasion PO, where terminals that can be woken up by the plurality of wake-up signals are not completely the same.

The receiving module 420 monitors the plurality of wake-up signals. If the receiving module detects that the terminal detects at least one of the plurality of wake-up signals for the PO, the receiving module monitors a downlink control channel at the PO.

Optionally, the plurality of wake-up signals include a dedicated wake-up signal corresponding to a terminal group to which the terminal belongs, where the dedicated wake-up signal corresponding to the terminal group is used to wake up a terminal in the terminal group.

Optionally, the terminal belongs to only one terminal group, or the terminal belongs to two or more terminal groups.

Optionally, a first terminal group in the two or more terminal groups includes terminals in a plurality of or all other terminal groups.

Optionally, the plurality of wake-up signals include a first common wake-up signal, where the first common wake-up signal is used to wake up a first-type terminal, and the first-type terminal is a terminal that needs to monitor a plurality of wake-up signals for the PO.

Optionally, the plurality of wake-up signals include a second common wake-up signal, where the second common wake-up signal is used to wake up a second-type terminal, and the second-type terminal is a terminal that needs to monitor one wake-up signal for the PO.

Optionally, the receiving module receives indication information, where the indication information is used to indicate that the terminal needs to monitor the plurality of wake-up signals.

The terminal 400 may be a communications apparatus. For example, the terminal 400 may be a chip.

The processing module 410 and the receiving module 420 may be implemented by using software and/or hardware.

An example of the processing module 410 is a processor. An example of the receiving module 420 is a receiver. Another example of the receiving module 420 is a communications interface.

For example, when the terminal 400 is a chip, the processing module 410 may be a processor, and the receiving module 420 may be a communications interface.

Optionally, the terminal 400 may further include a memory, configured to store a program instruction executed by the processing module. The memory may be integrated into the processor 410.

Optionally, the terminal 400 may further include a transmitter, configured to send data or signaling. The transmitter and the receiver may be integrated together and collectively referred to as a transceiver.

Figure 5:
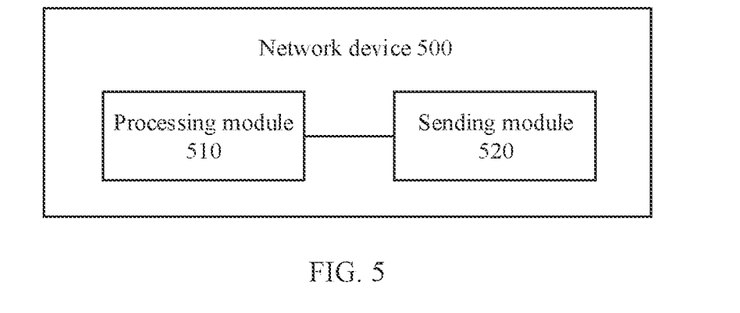
FIG. 5 is a schematic structural diagram of a network device according to an embodiment of this application.

FIG. 5 is a schematic structural diagram of a network device according to an embodiment of this application. It should be understood that a network device 500 shown in FIG. 5 is merely an example. The network device in this embodiment of this application may further include another module or unit, or include modules with functions similar to those of the module in FIG. 5, or may not necessarily include all modules in FIG. 5.

The network device 500 may be configured to perform the steps performed by the network device in the method shown in FIG. 3. For example, the network device 500 may include a processing module 510 and a sending module 520.

The processing module 510 determines a plurality of wake-up signals that can wake up a to-be-woken-up terminal for one paging occasion PO, where terminals that can be woken up by different wake-up signals in the plurality of wake-up signals are not completely the same; and determines a target wake-up signal of the to-be-woken-up terminal from the plurality of wake-up signals.

The sending module 520 sends the target wake-up signal before the PO.

Optionally, the plurality of wake-up signals include a dedicated wake-up signal corresponding to the terminal group to which the to-be-woken-up terminal belongs, where the dedicated wake-up signal corresponding to the terminal group is used to wake up a terminal in the terminal group.

Optionally, the to-be-woken-up terminal belongs to only one terminal group, or the to-be-woken-up terminal belongs to two or more terminal groups.

Optionally, a first terminal group in the two or more terminal groups includes terminals in a plurality of or all other terminal groups.

Optionally, the plurality of wake-up signals include a first common wake-up signal, where the first common wake-up signal is used to wake up a first-type terminal, and the first-type terminal is a terminal that needs to monitor a plurality of wake-up signals for the PO.

Optionally, the plurality of wake-up signals include a second common wake-up signal, where the second common wake-up signal is used to wake up a second-type terminal, and the second-type terminal is a terminal that needs to monitor one wake-up signal for the PO.

Optionally, the sending module sends indication information to the to-be-woken-up terminal, where the indication information is used to indicate that the to-be-woken-up terminal needs to monitor the plurality of wake-up signals.

The network device 500 may be a communications apparatus. For example, the network device 500 may be a chip.

The processing module 510 and the sending module 520 may be implemented by using software and/or hardware.

An example of the processing module 510 is a processor. An example of the sending module 520 is a transmitter. Another example of the sending module 520 is a communications interface.

For example, when the network device 500 is a chip, the processing module 510 may be a processor, and the sending module 520 may be a communications interface.

Optionally, the network device 500 may further include a memory, configured to store a program instruction executed by the processing module. The memory may be integrated into the processor 510.

Optionally, the network device 500 may further include a receiver, configured to receive data or signaling. The transmitter and the receiver may be integrated together and collectively referred to as a transceiver.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the division into units is merely logical function division and there may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

It should be understood that, the processor in the embodiments of this application may be a central processing unit (CPU), or the processor may further be another general-purpose processor, a digital signal processor (DSP), an application-specific integrated circuit (ASIC), a field programmable gate array (FPGA), or another programmable logical device, discrete gate or transistor logical device, discrete hardware component, or the like. The general-purpose processor may be a microprocessor, or the processor may be any conventional processor, or the like.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
    determining, by a first terminal, to monitor a first plurality of wake-up signals for a first paging occasion (PO), with the first terminal able to be woken up by each of the first plurality of wake-up signals, wherein the first terminal is a first-type terminal configured to monitor more than one wake-up signal for one PO, and the first-type terminal is capable of being woken up by a first common wake-up signal, wherein the first plurality of wake-up signals comprise at least one of the first common wake-up signal or a second common wake-up signal, the second common wake-up signal is used to wake up a second-type terminal, and the second-type terminal is configured to monitor one wake-up signal for one PO; and
    when the first terminal detects the second common wake-up signal, monitoring, by the first terminal, a first downlink control channel at the first PO.

2. The method according to claim 1, wherein the first plurality of wake-up signals comprise a dedicated wake-up signal corresponding to a terminal group to which the first terminal belongs, and the dedicated wake-up signal corresponding to the terminal group is used to wake up a terminal in the terminal group.

3. The method according to claim 1, wherein the method further comprises:
    receiving, by the first terminal, indication information, wherein the indication information indicates that the first terminal needs to monitor the first plurality of wake-up signals.

4. The method according to claim 1, wherein the method further comprises:
    determining, by the first terminal, to monitor a second plurality of wake-up signals for a second PO, with the first terminal able to be woken up by each of the second plurality of wake-up signals, wherein the first-type terminal is capable of being woken up by a third common wake-up signal, the second plurality of wake-up signals comprise at least one of the third common wake-up signal or a fourth common wake-up signal, and the fourth common wake-up signal is used to wake up the second-type terminal; and
    when the first terminal detects the third common wake-up signal, monitoring, by the first terminal, a second downlink control channel at the second PO.

5. A method comprising:
    determining, by a network device, a plurality of wake-up signals to wake up a to-be-woken-up terminal for a first paging occasion (PO), wherein the to-be-woken-up terminal is able to be woken up by each of the plurality of wake-up signals, the plurality of wake-up signals comprise at least one of a first common wake-up signal or a second common wake-up signal, the first common wake-up signal is used to wake up a first-type terminal, the first-type terminal is configured to monitor more than one wake-up signal for one PO, the second common wake-up signal is used to wake up a second-type terminal, and the second-type terminal is configured to monitor one wake-up signal for one PO;
    determining, by the network device, a first target wake-up signal from the plurality of wake-up signals for waking up the to-be-woken-up terminal, wherein the first target wake-up signal is the second common wake-up signal; and
    sending, by the network device, the first target wake-up signal before the first PO.

6. The method according to claim 5, wherein the plurality of wake-up signals comprise a dedicated wake-up signal corresponding to a terminal group to which the to-be-woken-up terminal belongs, and the dedicated wake-up signal corresponding to the terminal group is used to wake up a terminal in the terminal group.

7. The method according to claim 5, wherein the method further comprises:
    sending, by the network device, indication information to the to-be-woken-up terminal, wherein the indication information indicates that the to-be-woken-up terminal needs to monitor the plurality of wake-up signals.

8. The method according to claim 5, wherein the method further comprises:
    determining, by the network device, a second target wake-up signal from the plurality of wake-up signals for waking up the to-be-woken-up terminal, wherein the second target wake-up signal is the first common wake-up signal; and
    sending, by the network device, the second target wake-up signal before the first PO.

9. A communications device, comprising a processor and a transceiver, wherein:
    the processor is configured to determine to monitor a first plurality of wake-up signals for a first paging occasion (PO), with the communications device able to be woken up by each of the first plurality of wake-up signals, wherein the communications device is a first-type communications device configured to monitor more than one wake-up signal for one PO, and the first-type communications device is capable of being woken up by a first common wake-up signal, wherein the first plurality of wake-up signals comprise at least one of the first common wake-up signal or a second common wake-up signal, the second common wake-up signal is used to wake up a second-type communications device, and the second-type communications device is configured to monitor one wake-up signal for one PO; and
    the transceiver is configured to detect at least one of the first plurality of wake-up signals for the first PO, and to monitor a downlink control channel at the first PO when the second common wake-up signal is detected.

10. The communications device according to claim 9, wherein the first plurality of wake-up signals comprise a dedicated wake-up signal corresponding to a communications device group to which the communications device belongs, and the dedicated wake-up signal corresponding to the communications device group is used to wake up at least one communications device in the communications device group.

11. The communications device according to claim 9, wherein the transceiver is further configured to:

receive indication information, wherein the indication information indicates that the communications device needs to monitor the first plurality of wake-up signals.

12. The communications device according to claim 9, wherein the processor is further configured to determine to monitor a second plurality of wake-up signals for a second PO, with the communications device able to be woken up by each of the second plurality of wake-up signals, wherein the first-type communications device is capable of being woken up by a third common wake-up signal, the second plurality of wake-up signals comprise at least one of the third common wake-up signal or a fourth common wake-up signal, and the fourth common wake-up signal is used to wake up the second-type communications device; and when the third common wake-up signal is detected, monitor a second downlink control channel at the second PO.

13. A network device, comprising a processor and a transceiver, wherein:
the processor is configured to: determine a plurality of wake-up signals to wake up a to-be-woken-up terminal for a first paging occasion (PO), wherein the to-be-woken-up terminal is able to be woken up by each of the plurality of wake-up signals, and determine a first target wake-up signal from the plurality of wake-up signals for waking up the to-be-woken-up terminal, wherein the plurality of wake-up signals comprise at least one of a first common wake-up signal or a second common wake-up signal, the first common wake-up signal is used to wake up a first-type terminal, the first-type terminal is configured to monitor more than one wake-up signal signals for one PO, the second common wake-up signal is used to wake up a second-type terminal, and the second-type terminal is configured to monitor one wake-up signal for one PO, wherein the first target wake-up signal is the second common wake-up signal; and
the transceiver is configured to send the first target wake-up signal before the first PO.

14. The network device according to claim 13, wherein the plurality of wake-up signals comprise a dedicated wake-up signal corresponding to a terminal group to which the to-be-woken-up terminal belongs, and the dedicated wake-up signal corresponding to the terminal group is used to wake up a terminal in the terminal group.

15. The network device according to claim 13, wherein the transceiver is further configured to:
send indication information to the to-be-woken-up terminal, wherein the indication information indicates that the to-be-woken-up terminal needs to monitor the plurality of wake-up signals.

16. The network device according to claim 13, wherein the processor is further configured to determine a second target wake-up signal from the plurality of wake-up signals for waking up the to-be-woken-up terminal, wherein the second target wake-up signal is the first common wake-up signal; and
the transceiver is further configured to send the second target wake-up signal before the first PO.

* * * * *

UNITED STATES PATENT AND TRADEMARK OFFICE
CERTIFICATE OF CORRECTION

PATENT NO. : 11,659,617 B2  
APPLICATION NO. : 17/171510  
DATED : May 23, 2023  
INVENTOR(S) : Mi et al.

Page 1 of 1

It is certified that error appears in the above-identified patent and that said Letters Patent is hereby corrected as shown below:

In the Claims

Claim 13, Column 26, Line 1; delete "signals".

Signed and Sealed this
Twenty-seventh Day of June, 2023

Katherine Kelly Vidal
*Director of the United States Patent and Trademark Office*